Sept. 23, 1958  P. E. BALOGA  2,852,939
PRIMARY ABSOLUTE PRESSURE MEASURING DEVICE
Filed Oct. 10, 1955  2 Sheets-Sheet 1

INVENTOR.
PAUL E. BALOGA
BY Lyon+Lyon
ATTORNEYS

INVENTOR.
PAUL E. BALOGA
BY Lyon & Lyon
ATTORNEYS

United States Patent Office 2,852,939
Patented Sept. 23, 1958

2,852,939
PRIMARY ABSOLUTE PRESSURE MEASURING DEVICE

Paul E. Baloga, Pasadena, Calif., assignor to California Institute Research Foundation, Pasadena, Calif., a corporation of California Application October 10, 1955, Serial No. 539,546

12 Claims. (Cl. 73—401)

This invention relates to primary absolute pressure measuring devices or gages and has particular application in the measurement of pressures in the range between 100 and .005 millimeters of mercury.

Included in the objects of this invention are:

First, to provide a primary absolute gage which utilizes a gaseous flow phenomenon which occurs at an interface of a gas and a wall at low pressure, commonly known as "thermal creep." An important effect of thermal creep is to cause a pressure gradient along a length of a tube, which becomes substantial in the case of a tube having a small diameter in relation to the mean free path of gas molecules, and a substantial temperature gradient between its ends.

Second, to provide a primary absolute gage wherein the region, the vacuum pressure of which is to be determined, is connected to a heated chamber, the temperature of which is held constant or measured; wherein a tube of relatively large internal diameter and a tube, or bundle of tubes, of known small internal diameter have hot ends communicating with the chamber and remote or cool ends, and wherein means such as a micro-manometer is employed to measure the pressure differential between said remote or cool ends.

Third, to provide a primary absolute gage of this type wherein by use of a pair of tubes of known small but different diameters or corresponding bundles of such tubes may be employed in conjunction with a heated chamber of known temperature to determine the pressure to be measured.

With the above and other objects in view, reference is directed to the accompanying drawings in which.

Figures 1, 5:
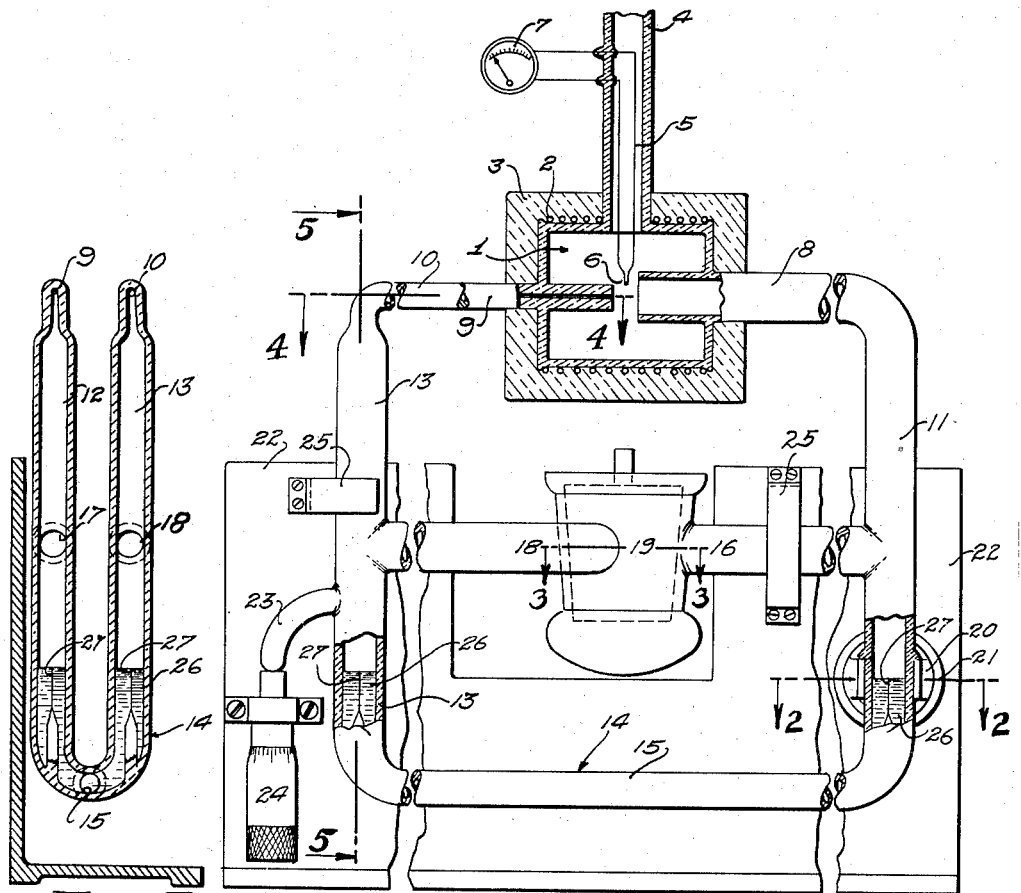
Figure 1 is a substantial fragmentary, diagrammatical view, partially in section and partially in elevation, showing an embodiment of the primary absolute pressure gage.
Figure 5 is a fragmentary partially sectional, partially elevational view through 5—5 of Figure 1 showing the manometer legs connected with the pressure differential tubes.
Figure 6:
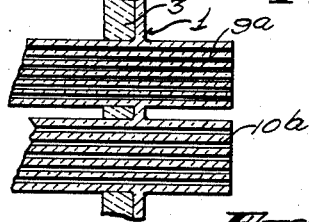
Figure 6 is a fragmentary, sectional view corresponding to Figure 4 showing the use of bundles of pressure differential tubes.
Figures 2, 3:
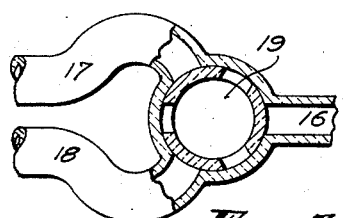
Figure 2 is a fragmentary transverse sectional view through 2—2 of Figure 1 showing the pivot support.
Figure 3 is a fragmentary sectional view through the equalizer valve taken through 3—3 of Figure 1.
Figure 4:
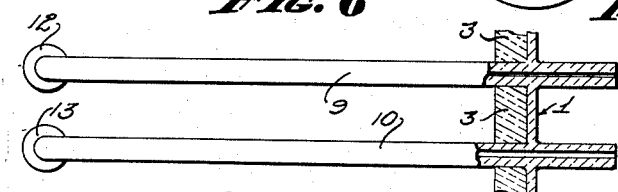
Figure 4 is a fragmentary sectional view through 4—4 of Figure 1 showing the pair of pressure differential tubes.

Works on kinetic theory show that thermal creep along a surface is due to the diffusely-reflected molecules at different temperatures impinging upon the wall and imparting to it a tangential force in the opposite direction to the temperature gradient. Therefore, the gas near the wall receives an equal force in the direction of the thermal gradient. The resulting creep velocity is:

$$u = \frac{\mu R}{p'} \cdot \frac{dT'}{dx} \quad (1)$$

where $u$ = creep velocity
$\mu$ = coefficient of viscosity
$R$ = gas constant
$p'$ = local pressure
$dT'/dx$ = local temperature gradient of the wall If the inside radius, $a$, of the tube is small in relation to the mean free path, $\lambda$, of the molecules ($\lambda/a$ approximately between 0.01 and 0.1), and if the tube length, L, is very large compared to $a$, then a combination of Hagen-Poiseuille type flow and slip boundary conditions will occur. The creep velocity can be combined with the slip condition to obtain the boundary condition, to the first order:

$$u = \theta = \frac{du}{dr} + \frac{3}{4} \frac{\mu R}{p'} = \frac{dT'}{dx}; \text{ at } r = a \quad (2)$$

where $\theta$ = coefficient of slip, approximately equal to $\lambda$.

Using this boundary condition the mass flow rate, Q is found to be:

$$Q = \frac{\pi a^4 p'}{8 r t'} \left(1 + 4\frac{\lambda}{a}\right) \frac{dp'}{dx} + \frac{3}{4} \pi \frac{\mu a^2}{T'} \frac{dT'}{dx} \quad (3)$$

For the case of a measuring tube, the mass flow is zero for equilibrium conditions, thus giving $$\frac{dp'}{dx} = \frac{6 \mu^2 R}{^2 a p' \left(1 + 4\frac{\lambda}{a}\right)} \cdot \frac{dT}{dx} \quad (4)$$

but from kinetic theory $$p' = 1.48 \sqrt{\frac{R}{\gamma}} \cdot \frac{u \sqrt{T'}}{\lambda} \quad (5)$$

where $\gamma$ = ratio of specific heat (1.40 for air).

Substituting Eq. 5 in Eq. 4, $$\frac{dp'}{p'} = \frac{3.8 \left(\frac{\lambda}{a}\right)^2}{1 + 4\frac{\lambda}{a}} \cdot \frac{dT'}{T'} \quad (6)$$

The Knudsen number, $Kn_a$, can be defined as $\lambda/a$, in which case Eq. 6 reduces to:

$$\frac{dp'}{p'} = \frac{3.8 \, Kn_a^2}{1 + 4 \, Kn_a} \cdot \frac{dT'}{T'} \quad (7)$$

Eq. 7 gives the effect of a temperature gradient along the length of a tube for small values of $Kn_a$.

For the case of very large values of $Kn_a$ ($Kn_a$ approximately greater than 10), the phenomenon of transpiration occurs where the gas molecules are affected primarily by collisions with the tube walls rather than by collisions among the molecules. The result is that $p'/\sqrt{T'}$ is made constant along the tube for equilibrium conditions. Therefore, $$\frac{dp'}{p'} = \frac{1}{2} \cdot \frac{dT'}{T'} \quad (8)$$

Eq. 8 describes the effect of a temperature gradient for large values of $Kn_a$, or for the free molecule flow regime.

A semi-empirical equation for the transition region between slip flow and free molecule flow has been derived by matching experiments with hydrogen to theory. The derivation is too long and involved to be reproduced here, but the final result is described by the following equation:

$$\frac{dp'}{p'} = \frac{1}{2}\left[1 + \frac{2.46\ (Kn_a + 3.15)}{Kn_a\ (Kn_a + 24.6)}\right]^{-2} \cdot \frac{dT'}{T'} \quad (9)$$

Figure 7:
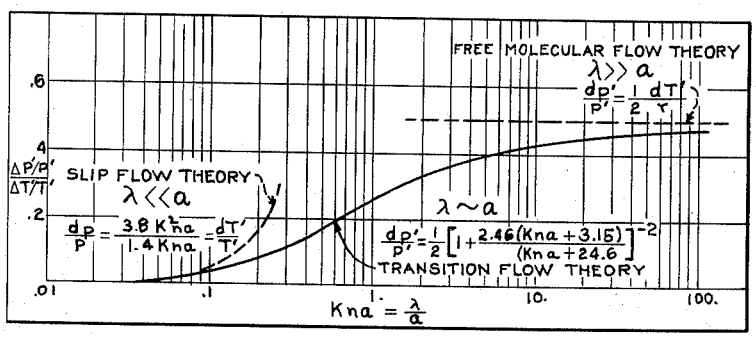
Figure 7 is a graph illustrating the conditions and the pressure range of the primary absolute pressure gage.

Eqs. 7, 8, and 9, therefore, describe the effect of a temperature gradient for a complete range of Knudsen numbers. In order to see more clearly the implications of the equations it is useful to plot $(dp'/p')/(dT'/T')$ versus $Kn_a$. This is shown in Figure 7.

The primary absolute pressure gage arranged to utilize the phenomena set forth above includes a heating chamber 1 surrounded by heating element 2 and jacket 3. The heating chamber is connected by a conduit 4 to an evacuated region the pressure of which is to be measured. A thermometer 5 is provided to measure the temperature of the heating chamber. This may comprise a thermocouple 6 and meter 7. Alternatively conventional automatic means may be provided to maintain the chamber 1 at a pre-selected temperature.

Protruding into and extending from the heating chamber is a major or reference tube 8. Similarly a pair of minor or pressure differential tubes 9 and 10 extend into and protrude from the heating chamber. The heated ends of the tubes 8, 9, and 10 within the chamber may be disposed in confronting relation. The remote or extended ends of the tubes are so located as to be substantially outside the influence of the heating chamber. The tubes are preferably formed of glass or other material having good heat insulation properties to minimize conduction from the hot ends of the tubes to the cool ends thereof.

The cool extremities of the tubes 8, 9, and 10 communicate with vertical sections 11, 12 and 13 of relatively large diameter which form the upright legs of a micro-manometer 14.

The legs 11, 12 and 13 are connected at their lower ends by a horizontal cross tube 15. The three legs are interconnected by equalizer tubes 16, 17 and 18 which lead from the respective legs to an equalizer valve 19 arranged to interconnect or isolate the legs 11, 12 and 13. The manometer leg 11 is supported by a clip or yoke 20 extending from tubular bearing member 21 vertically disposed in a mounting frame 22. Extending laterally from the other micro-manometer legs 12 and 13 is an arm 23, the extremity of which bears against the stem of a micrometer 24 suitably supported by the mounting frame 21. Suitable guide brackets or guides 25 may extend from the mounting frame to hold the assembly in a vertical position, but permits the assembly to pivot a limited amount about the axis of the bearing 21.

The micro-manometer is filled to a pre-determined level with a liquid 26 of the type customarily employed in manometers. Because of the low pressures to be measured, a manometer liquid having a low vapor pressure is required and preferably one with a specific gravity of 1.0. A satisfactory liquid is Dow Corning Compound 200 which has a viscosity of 10 centistokes; a vapor pressure of less than .0001 mm. Hg at 80° F.; and a specific gravity of .959 at 80° F. This liquid is a silicone oil.

In order to effect accurate balancing of the liquid in the legs of the manometer, each leg 11, 12 and 13 is provided with a vertical indicating needle 27 extending upwardly thereon. In use, the manometer is tilted to bring a selected needle point into coincidence with the surface of the liquid. Suitable illuminating means, not shown, are provided to illuminate the surfaces of the liquid in the micro-manometer legs 10, 11, and 12 to detect the needle point.

Operation of the primary absolute pressure gage as illustrated in the drawings is as follows:

Prior to use, the micromanometer is filled with the liquid 26 to cover the needles or cat whiskers 27 so that the points are submerged about .005 to .015 inch. With the manometer legs 11, 12 and 13 connected through the tubes 8, 9 and 10 and the heating chamber 1 to the source of pressure to be measured, the valve 19 is positioned to inter-connect all legs so that the pressures in the micromanometer legs are balanced. With no pressure differential existing between the legs 11, 12 and 13 a micrometer reading is taken when each needle or cat whisker pierces the liquid surface in the corresponding leg. It is possible to discern a change as small as .00025 and is best done by observing the reflection from a light source on the liquid surface. At the position of incipient piercing of the liquid surface a small "pimple" is readily discerned. The readings thus taken are reference or "null" readings.

The stopcock or valve 19 is then closed so that each leg is isolated from the others. The heating chamber is brought up to or maintained at a selected temperature. When equilibrium is reached a pressure differential exists between the major or reference tube 8 and the minor or pressure differential tubes 9 and 10 which is indicated by corresponding changes in the height of the liquid in the manometer legs 11, 12 and 13. The pressure differential observed in the manometer legs 12 and 13 varies inversely to the diameters of the minor tubes 9 and 10, as brought out hereinafter.

The manometer pressure difference between tubes 9 or 10 and the reference tube 8 is measured by adjusting the micrometer to bring the selected needle or cat whisker to the liquid level. This is done for the legs 12 and 13 in turn and the reading subtracted from the reference reading. This gives the pressure differential ($\Delta P$) between each of the minor tubes 9 and 10 (which are of two known and different internal diameters at a known temperature) major or reference tube 8. Measurement of the temperature of the manometer liquid, subtracted from the heating chamber temperature gives the temperature differential ($\Delta T$).

Figure 8:
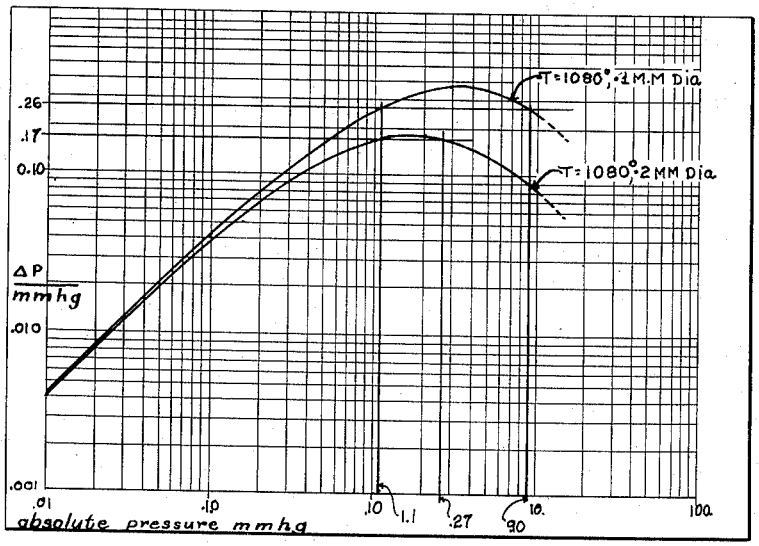
Figure 8 is a chart showing the relation of the pressure being measured to manometer readings in millimeters of mercury.

Using Equations 7, 8, 9 a family of curves can be constructed which will enable one to establish the absolute pressure which exists in the heating chamber 1. These curves are represented in Figure 8 and are derived as follows:

Substituting $$\Delta p \text{ for } dp'$$
$$p_{ave} \text{ for } p'$$
$$\Delta T \text{ for } dT'$$
$$T_{ave} \text{ for } T'$$

and rearranging Equations 7, 8, 9 gives:

$$\frac{\frac{\Delta p}{p_{ave}}}{\frac{\Delta T}{T_{ave}}} = \frac{3.8\ Kn_a^2}{1 + 4\ Kn_a} \quad (7b)$$

(for small values of $Kn_a$)

$$\frac{\frac{\Delta p}{p_{ave}}}{\frac{\Delta T}{T_{ave}}} = \frac{1}{2} \quad (8b)$$

(for very large values of $Kn_a$)

$$\frac{\frac{p}{p_{ave}}}{\frac{T}{T_{ave}}} = \frac{1}{2}\left[1 + \frac{2.46\ (Kn_a + 3.15)^{-2}}{Kn_a\ (Kn_a + 24.6)}\right] \quad (9b)$$

(for intermediate values of $Kn_a$)

$p_{ave}$ = average pressure = ½ ($p_{hot} + p_{cold}$) mm. Hg $T_{ave}$ = average temperature
= ½ ($T_{hot} + T_{cold}$) °R (degrees Rankine)

Using the appropriate equation the ratio $$\frac{\frac{\Delta p}{p_{ave}}}{\frac{\Delta T}{T_{ave}}}$$

is computed for a series of Knudsen numbers from 100 to .001. This ratio will arrange from .5 and approaches 0 as a limit and if plotted $$\frac{\frac{\Delta p}{p_{ave}}}{\frac{\Delta T}{T_{ave}}}$$

versus Knudsen number will give a curve like Figure 7.

With these computed values the ratio of $$\frac{\Delta P}{P_{ave}}$$

can be computed by choosing $T_{hot}$ (chamber temperature) and measuring $T_{cold}$ (manometer temperature) for the same series of Knudsen numbers. This can be done for several $\Delta T$'s ($T_{hot} - T_{cold}$) $\Delta T$ of 300° F., 600° F., 1000° F. or any other which might be of interest.

Now for any one tube of known internal diameter and a known temperature one can compute a series of molecular mean free paths ($\lambda$) for the series of Knudsen numbers originally chosen.

A formula suitable for this purpose may be stated as:

$$\lambda = 8.61 \times 10^{-6} \text{c m.} \left[\frac{V_{ave} \text{°R}}{492° \text{R}}\right]\left[\frac{760 \text{ mm. Hg}}{P \text{ mm. Hg}}\right] \quad (10)$$

This series of mean free paths which are obtained from the above expression are used to compute absolute pressures at any given $T_{ave}$. This is done for at least two tube sizes which are incorporated into the original design.

With the previously computed series of ratios of $$\frac{\Delta p}{p_{ave}}$$

and the above computed absolute pressures, a pressure difference $\Delta p$ can be computed for any chosen tube diameter, pressure and temperature. All of these values are plotted on a full-logarithm graph resulting in the series of curves shown in Figure 8. Here is plotted $\Delta p$ (mm. Hg) versus absolute pressure (P). Although the abscissa shows only three cycles of pressure plotted, it is preferable to use at least five cycles permitting a range of absolute pressures of .001 to 100 mm. Hg to be represented.

It will be noted that on the curve, for any single $\Delta p$, there exists two values of P one above and one below a certain pressure. Thus, in order to determine which of the two pressures actually exists in the heated chamber, it is necessary to:

A. Measure twice with a single minor tube at two heated chamber temperatures or;

B. Measure with two minor tubes of different diameter while maintaining a constant heated chamber temperature.

In practice the later procedure is usually preferable and accordingly a construction having a pair of minor tubes has been described.

By way of illustration, let it be assumed that the internal diameter of the minor tube 9 is .1 mm.; that of minor tube 10 is .2 mm.; the temperature in the heated chamber connected to the source of unknown pressure is 1080° F.; and that the manometer liquid temperature is 80° F.

Let it be assumed further that the following readings were obtained:

$\Delta P$ for the .1 mm. minor tube 9 = .26 mm. Hg $\Delta P$ for the .2 mm. minor tube 10 = .17 mm. Hg referring to the curves in Fig. 8 for $T_h$ 1080:

| .1 mm. minor tube 9 | .2 mm. minor tube 10 |
|---|---|
| $\Delta P$ = .26 mm. Hg $P = \begin{cases} 1.1 \text{ mm. Hg} \\ 9.0 \text{ mm. Hg} \end{cases}$ | $\Delta P$ = .17 mm. Hg $P = \begin{cases} 1.1 \text{ mm. Hg} \\ 2.7 \text{ mm. Hg} \end{cases}$ |

Thus, the reading common to both tubes determines that the actual pressure is $p = 1.1$ mm. Hg.

Inasmuch as the pressures to be measured are relatively small, it is preferred to make the major reference tube 8 of quite large diameter so that the pressure drop from the hot to the cold end therein is negligible. Also to bring the apparatus more quickly into balance, it is preferred to provide bundles 9a and 10a of minor tubes as shown in Figure 5 rather than single minor tubes. While it is preferred that the major tube be quite large, it is not necessary that it be so large as to exhibit no appreciable thermal creep; that is, it is not necessary if the pressure difference in the major tube can be pre-determined. Such pressure differences in the major tube merely require a correction of the result due to this contribution.

In the drawings the parts are shown substantially diagrammatically and shown as constructed of glass and shown as arranged in a form of a substantially vertically disposed frame. It should be also understood that other materials may be used and that the physical relationship may vary substantially without departing from the essence of the invention.

The gage is referred to as a "primary" absolute pressure gage, for the reason that it can be precalibrated from a knowledge of the dimensions of the tubes and temperature of the hot and cold ends. It need not be used as a primary gage, for example, the tube size need not be known in which case the gage may be calibrated from a series of known pressures.

Figure 9:
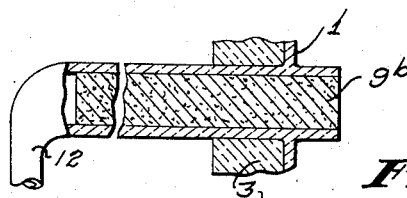
Figure 9 is a fragmentary substantially diagrammatical view of a pressure differential tube utilizing powdered material.
Figure 10:
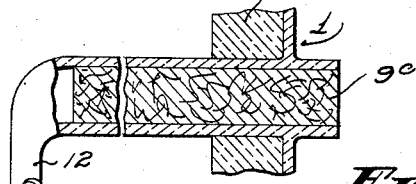
Figure 10 is another fragmentary substantially diagrammatical view of another pressure differential tube utilizing a fibrous material.

Thus, the bundle of tubes 9a and 10a may comprise tubes of such small diameter that they cannot readily be measured, or in place of such tubes a porous rod like member 9b may be formed of pressed or pressed and sintered powdered material shown in Figure 9 or of packed fibrous material 9c as indicated in Figure 10.

Having thus described certain embodiments and applications of my invention, I do not desire to be limited thereto, but intend to claim all novelty inherent in the appended claims.

I claim:

1. A pressure gage, comprising a chamber communicating with a region to be evacuated; means for heating said chamber; a first tube of relatively large diameter having a warm end within said chamber and a cool end remote therefrom; a second tube of relatively small diameter having a warm end within said chamber and a cool end remote therefrom; and means for measuring the pressure differential existing between the cool ends of said first and second tubes.

2. A pressure gage, comprising: a chamber communicating with a region to be evacuated; means for heating said chamber; a first tube of relatively large diameter having a warm end within said chamber and a cool end remote therefrom; a second tube of relatively small diameter having a warm end within said chamber and a cool end remote therefrom; and a manometer having ends in communication with the cool ends of said tubes to measure the pressure differential existing therebetween.

3. A pressure gage, comprising: a chamber communicating with a region to be evacuated; means for heating said chamber; a first tube of relatively large diameter having a warm end within said chamber and a cool end remote therefrom; a second tube of relatively small diameter having a warm end within said chamber and a cool end remote therefrom; means defining a conduit of relatively large diameter connecting the cool ends of said tubes; a valve in said conduit adapted when open, to permit balancing of pressures at the cool ends of said tubes; and means operable when said valve is closed, for measuring the pressure differential existing between the cool ends of said tubes.

4. A pressure gage, comprising: a chamber communicating with a region to be evacuated; means for heating said chamber; a first tube of relatively large diameter having a warm end within said chamber and a cool end remote therefrom; a second tube of relatively small diameter having a warm end within said chamber and a cool end remote therefrom; means defining a conduit of relatively large diameter connecting the cool ends of said tubes; a valve in said conduit adapted when open, to permit balancing of pressures at the cool ends of said tubes; and a manometer bridging said valve to measure, when said valve is closed, the pressure differential existing between the cool ends of said tubes.

5. A pressure gage comprising: a minor diameter tube; a major diameter tube; said tubes communicating with an evacuated region the pressure of which is to be measured; means for heating the ends of said tubes proximal to said evacuated region in contrast to the ends of said tubes remote therefrom; and means for measuring the pressure differential between the remote ends of said major and minor tubes.

6. A pressure gage comprising: a minor tube having a relatively small diameter relative to the mean free path of gas molecules moving therein; a major reference tube having a relatively large diameter relative to the mean free path of said gas molecules; means for producing a temperature differential between the extremities of each tube to establish a hot end and a cool end; means for exposing the hot ends of said tubes to an evacuated region; and means for measuring the pressure differential between the cool ends of said tubes.

7. A pressure gage comprising: a minor tube having a relatively small diameter relative to the mean free path of gas molecules moving therein; a major reference tube having a relatively large diameter relative to the mean free path of said gas molecules; means for producing a temperature differential between the extremities of each tube to establish a hot end and a cool end; means for exposing the hot ends of said tubes to an evacuated region; and a manometer having ends in communication with the cool ends of said tubes to measure the pressure differential existing therebetween.

8. A pressure gage, comprising: a pair of minor tubes of different diameters but each having a small diameter relative to the mean free path of gas molecules moving therein; a major reference tube having a relatively large diameter relative to the mean free path of gas molecules moving therein; means for producing a predetermined temperature differential between the extremities of each tube; means common to the hot ends of said tubes communicating with an evacuated region the pressure of which is to be measured; and means for measuring the pressure differential between each minor tube and reference tube.

9. A pressure gage, comprising: a pair of minor tubes of different diameters but each having a small diameter relative to the mean free path of gas molecules moving therein; a major reference tube having a relatively large diameter relative to the mean free path of gas molecules moving therein; means for producing a predetermined temperature differential between the extremities of each tube; means common to the hot ends of said tubes communicating with an evacuated region the pressure of which is to be measured; a manometer having an upright reference leg connected with said reference tube, a pair of upright measuring legs connected with said minor tubes; and a cross tube joining said manometer legs.

10. A micro-manometer, comprising: a tubular structure including a cross tube and a pair of upright tubes, said tubes adapted to be exposed to a variable pressure differential to be measured; a liquid filling said cross tube and partially filling said upright tubes and adapted to be displaced therein in proportion to said pressure differential; means forming a fixed reference point with respect to at least one of said tubes for detecting coincidence of the liquid surface therein with said point; means for controllably pivoting said tubular structure to effect relative raising and lowering of said upright tubes to bring said liquid level into coincidence with said point; and means for measuring the position of said tubular structure when said liquid level and said point are in coincidence.

11. A micro-manometer, comprising: a tubular structure including a cross tube and a pair of upright tubes, said tubes adapted to be exposed to a variable pressure differential to be measured; a liquid filling said cross tube and partially filling said upright tubes and adapted to be displaced therein in proportion to said pressure differential; a duct interconnecting said upright tubes above the surfaces of the liquid therein to equalize the pressure therebetween; a valve for closing said duct; means forming a fixed reference point with respect to at least one of said tubes for detecting coincidence of the liquid surface therein with said point; means for controllably pivoting said tubular structure to effect relative raising and lowering of said upright tubes to bring said liquid level into coincidence with said point; and means for measuring the change in position of said tubular structure, when said upright tubes are subjected to equal pressure and when subjected to said differential pressure, required to bring said liquid level and said point into coincidence.

12. A micro-manometer as set forth in claim 11 wherein: a fixed reference point means is associated with each of said upright tubes and said measuring means is operable to measure the change in position of said tubular structure required to bring in sequence each of said reference points and corresponding liquid surface into coincidence.

References Cited in the file of this patent

UNITED STATES PATENTS

| | | |
|---|---|---|
| 664,465 | Claassen | Dec. 25, 1900 |
| 1,977,498 | Staegemann | Oct. 16, 1934 |
| 2,098,963 | Hexter | Nov. 16, 1937 |